Patented July 12, 1932

1,867,459

UNITED STATES PATENT OFFICE

GEORG KRÄNZLEIN, OF FRANKFORT-ON-THE-MAIN-HOCHST, GERMANY, AND ROBERT SEDLMAYR, OF AUSSIG, CZECHOSLOVAKIA, ASSIGNORS TO GENERAL ANILINE WORKS, INC., OF NEW YORK, N. Y., A CORPORATION OF DELAWARE

ARALKYLBENZANTHRONES AND PROCESS OF PREPARING THEM

No Drawing. Application filed April 18, 1929, Serial No. 356,290, and in Germany August 19, 1925.

The present invention relates to aralkyl-benzanthrones and process of preparing them.

We have found that well-defined and well crystallized reaction-products are obtainable by condensing a compound of the following general formula:

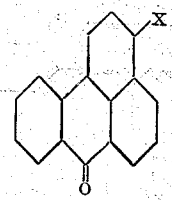

wherein the Bz 1-position, marked X, is unsubstituted with a compound of the following general formula:

wherein Y stands for halogen or hydroxyl and R stands for an aryl group of the benzene series. The condensation is preferably effected by heating molecular proportions of the said components in the presence of an indifferent organic diluent and of a catalyst. As diluent there may be used for instance trichlorobenzene, nitrobenzene or the like and as catalyst, copper, copper salts or zinc chloride.

The bodies obtainable according to the above described process are compounds of the following general formula:

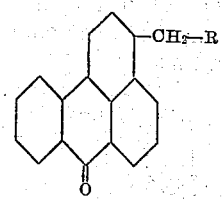

wherein R stands for a substituted or unsubstituted aromatic residue, the benzanthrone residue being substituted or not by any univalent substituent, forming intermediate products suitable for the preparation of dyestuffs.

The said bodies may also be obtained by interaction between benzyl-alcohols which are incapable of reacting upon one another, under the influence of the condensing agent which is present in the reaction mixture, and benzanthrone or a derivative or substitution product thereof. In this case for example sulfuric acid may be used as a condensing agent.

The following examples serve to illustrate our invention but they are not intended to limit it thereto, the parts being by weight.

(1) 46 parts of benzanthrone are heated to boiling temperature for 10–12 hours with 25 parts of benzyl-chloride in 460 parts of trichlorobenzene while adding a small quantity of copper powder or zinc chloride. Thereupon the solvent is driven off by means of water-vapor and the residue is filtered by suction, washed with water and dried. By boiling out the mass with alcohol, any small quantity of benzanthrone which may still adhere pass into solution. The residue is crystallized from glacial acetic acid or pyridine. In this manner the product is obtained in the form of feebly-yellowish needles having their melting point at 187° C. It dissolves in concentrated sulfuric acid to a red solution showing an orange-red fluorescence. Instead of benzyl-chloride substituted benzyl-chlorides, nitro- or chloro-benzyl chlorides may also be used.

(2) 23 parts of benzanthrone are dissolved in 250 parts of sulfuric acid of 60° Bé. To this solution 16 parts of para-nitrobenzyl-alcohol are added and the whole is stirred for about 48 hours on the water-bath. The mass is then poured into water, filtered by suction and dried. The reaction product is purified (as stated in Example 1) and recrystallized from a suitable solvent.

(3) 15 parts of 4.8-dichlorobenzanthrone, 100 parts of trichlorobenzene and 6.3 parts of benzyl chloride are heated to boiling temperature in the reflux apparatus for 17 hours with a minute quantity of copper-bronze. After the mass has been worked up (as described in Example 1), it yields, after recrystallization from methylbenzene, fine yellow needles, melting at 207° C. and dissolving in sulfuric acid to a yellowish-brown solution showing a slight fluorescence.

(4) 46 parts of benzanthrone, 400 parts of trichlorobenzene, 41 parts of 3-nitro-4-methoxy-benzyl chloride and 0.4 parts of copper powder are heated to boiling temperature for 12 hours. The product separating after cooling is filtered by suction, washed with alcohol and dried. After recrystallization from glacial acetic acid, the resulting Bz-1-(3'-nitro-4'-methoxy)-benzyl-benzanthrone dissolves in sulfuric acid to a red solution and having its melting point at 227° C.

We claim:

1. The process which comprises heating a compound of the following general formula:

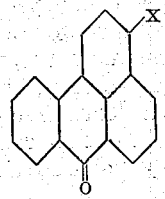

wherein the Bz 1-position, marked X, is unsubstituted, with a compound of the following general formula:

R—CH₂.Y wherein Y stands for halogen or hydroxyl and R stands for an aryl group of the benzene series in the presence of an indifferent organic diluent of a high boiling point and a catalyst.

2. The process which comprises heating a compound of the following general formula:

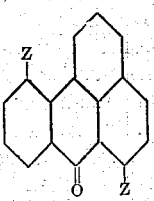

wherein Z stands for hydrogen or chlorine, with a compound of the following general formula:

wherein Y stands for chlorine or hydroxyl and X₁ stands for hydrogen or the methoxy group and X₂ for hydrogen or the nitro group, in the presence of an indifferent aromatic diluent of a high boiling point and a catalyst.

3. The process which comprises heating to boiling temperature benzanthrone with benzyl-chloride in the presence of tri-chlorobenzene and a small quantity of copper powder.

4. The process which comprises heating to boiling temperature 4.8-dichloro-benzanthrone with benzylchloride in the presence of trichlorobenzene and a small quantity of copper bronze.

5. The process which comprises heating to boiling temperature benzanthrone with 3-nitro-4-methoxy-benzylchloride in the presence of trichlorobenzene and a small quantity of copper powder.

6. As new products, the compounds of the following general formula:

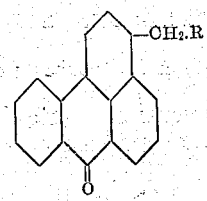

wherein R stands for an aryl group of the benzene series.

7. As new products, the compounds of the following general formula:

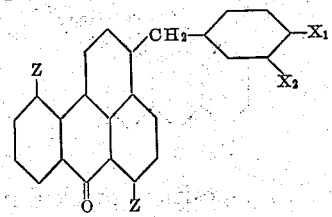

wherein Z stands for hydrogen or chlorine, X₁ for hydrogen or the methoxy group and X₂ for hydrogen or the nitro group.

8. As a new product, the compound of the following formula:

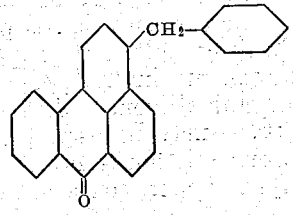

forming after recrystallization from glacial acetic acid feebly yellowish needles and dissolving in sulfuric acid to a red solution showing an orange red fluorescence.

9. As a new product, the compound of the following formula:

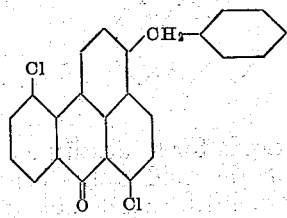

forming after recrystallization from methylbenzene fine yellow needles dissolving in sulfuric acid to a yellowish-brown solution.
10. As a new product, the compound of the following formula:
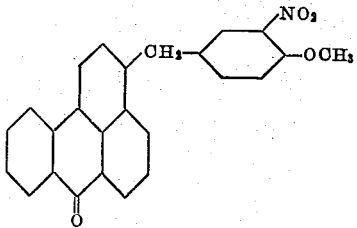
forming after recrystallization from glacial acetic acid a crystalline powder which dissolves in sulfuric acid to a red solution.
In testimony whereof, we affix our signatures.
GEORG KRÄNZLEIN.
ROBERT SEDLMAYR.